(12) United States Patent
Robinson et al.

(10) Patent No.: US 10,160,395 B2
(45) Date of Patent: Dec. 25, 2018

(54) VEHICLE-ATTACHED LIFTING AND TOOL SUPPORT DEVICE

(71) Applicants: James Allen Robinson, Nekoosa, WI (US); Jeremy James Robinson, Wisconsin Rapids, WI (US)

(72) Inventors: James Allen Robinson, Nekoosa, WI (US); Jeremy James Robinson, Wisconsin Rapids, WI (US)

( * ) Notice: Subject to any disclaimer, the term of this patent is extended or adjusted under 35 U.S.C. 154(b) by 115 days.

(21) Appl. No.: 13/922,388

(22) Filed: Jun. 20, 2013

(65) Prior Publication Data

US 2013/0341124 A1    Dec. 26, 2013

(51) Int. Cl.
*B60R 9/06* (2006.01)
*B60P 1/44* (2006.01)
(Continued)

(52) U.S. Cl.
CPC ............... *B60R 9/06* (2013.01); *A01D 34/84* (2013.01); *A01D 75/002* (2013.01); *B08B 1/04* (2013.01); *B60P 1/44* (2013.01); *B60P 1/4421* (2013.01); *B66F 9/075* (2013.01); *B66F 9/08* (2013.01); *B66F 9/127* (2013.01); *B66F 9/18* (2013.01); *B66F 11/04* (2013.01); *E02F 3/76* (2013.01); *E02F 3/7627* (2013.01); *E02F 3/848* (2013.01);
(Continued)

(58) Field of Classification Search
CPC ...... B66F 11/00–11/046; A01M 31/02; A01M 31/006; E06C 5/04; E06C 5/06; E06C 5/20; B62B 3/0625; E04G 1/24
See application file for complete search history.

(56) References Cited

U.S. PATENT DOCUMENTS 3,197,178 A * 7/1965 Nietz ................. E04F 21/1822
    108/106
3,379,281 A * 4/1968 Calletti ................. E04G 21/167
    182/113
(Continued)

OTHER PUBLICATIONS

The Auger Easer, Sande Specialties, Accessed on: Mar. 5, 2015 http://augereaser.com/index.htm.
(Continued)

*Primary Examiner* — Katherine W Mitchell
*Assistant Examiner* — Candace L Bradford
(74) *Attorney, Agent, or Firm* — Global Intellectual Property Agency, LLC; Daniel Boudwin

(57) ABSTRACT

A vehicle-attached lifting device and tool support is provided. The device comprises a dual-rail frame supported in an upright configuration by the vehicle tow hitch, wherein an internal subassembly support frame is positioned between the rails for the purposes of supporting different lifting and tool support subassemblies. Along the sides of the upright frame is a pair of ground support members that extend downward towards the ground to support the frame during operation, preventing the load from compressing the vehicle suspension or damaging the same. A winch controls the vertical positioning of the support frame within the dual-rail frame, which controls the position of a lifting or tool support subassembly. Many subassemblies are contemplated for use with the present invention for the purposes of assisting a user without requiring manual input therefrom. The device can also adjust with relation to the vehicle using different trailer hitch attachments.

22 Claims, 16 Drawing Sheets

(51) Int. Cl.
*E21B 7/02* (2006.01)
*A01D 34/84* (2006.01)
*B66F 11/04* (2006.01)
*B66F 9/075* (2006.01)
*E02F 3/76* (2006.01)
*B08B 1/04* (2006.01)
*B66F 9/08* (2006.01)
*B66F 9/18* (2006.01)
*E21B 10/44* (2006.01)
*A01D 75/00* (2006.01)
*B66F 9/12* (2006.01)
*E02F 3/84* (2006.01)
*E02F 3/96* (2006.01)

(52) U.S. Cl.
CPC ................ *E02F 3/96* (2013.01); *E21B 7/026* (2013.01); *E21B 7/028* (2013.01); *E21B 10/44* (2013.01)

(56) References Cited

U.S. PATENT DOCUMENTS

| | | | | |
|---|---|---|---|---|
| 3,439,372 A * | 4/1969 | Collier | ................ | B66F 11/046 15/50.1 |
| 5,393,194 A | 2/1995 | Smith | | |
| 5,564,522 A * | 10/1996 | Markin | ................ | B66F 11/044 182/2.7 |
| 5,951,236 A * | 9/1999 | Thompson | ................ | B66F 9/06 414/607 |
| 6,155,771 A * | 12/2000 | Montz | ................ | B60P 1/5433 212/180 |
| 6,626,748 B2 | 9/2003 | Homer | | |
| 6,769,858 B1 * | 8/2004 | Butler | ................ | B60P 1/4421 414/462 |
| 6,795,995 B1 * | 9/2004 | Holbus | ................ | A46D 1/00 15/208 |
| 6,889,779 B2 * | 5/2005 | Skarlupka, IV | ........ | E21B 7/028 173/148 |
| 6,932,555 B2 * | 8/2005 | Dale | ................ | B66F 9/06 187/226 |
| 7,575,120 B2 | 8/2009 | Beatty | | |
| 7,896,604 B1 | 3/2011 | Donlin et al. | | |
| 8,397,835 B1 * | 3/2013 | Lyngaas | ................ | E21B 7/008 175/18 |
| 8,833,523 B2 * | 9/2014 | Simpson | ................ | B66F 9/08 182/141 |
| 9,637,356 B2 * | 5/2017 | Birch | ................ | B66C 23/44 |
| 2005/0254925 A1 | 11/2005 | Braquet | | |
| 2006/0011351 A1 * | 1/2006 | Lambert | ................ | B66F 11/04 166/379 |
| 2006/0055130 A1 | 3/2006 | Williams | | |
| 2007/0074933 A1 * | 4/2007 | Kerns | ................ | A01M 31/025 182/127 |
| 2007/0166138 A1 * | 7/2007 | Brooks | ................ | A01D 87/122 414/471 |
| 2008/0149420 A1 * | 6/2008 | Cheatham | ................ | B60R 9/06 182/63.1 |
| 2008/0314690 A1 * | 12/2008 | Campbell | ............... | B66F 11/04 187/233 |

OTHER PUBLICATIONS

Drilling Ice with Ease, HEI UTVS, Publication date: Jan. 12, 2014, Accessed on: Jan. 12, 2014 https://www.youtube.com/watch?v=6ikYYu1CsI8.

Lake Puckaway Ice Auger Caddy for 4-Wheeler, JNB Guide Fishing, Published On: Feb. 22, 2012, Accessed on: Mar. 5, 2015 https://www.youtube.com/watch?v=njEHW0L22b0.

* cited by examiner

VEHICLE-ATTACHED LIFTING AND TOOL SUPPORT DEVICE

CROSS REFERENCE TO RELATED APPLICATION

This application claims the benefit of U.S. Provisional Application No. 61/662,416 filed on Jun. 21, 2012, entitled "Outdoorsman Assistant." The above identified patent application is herein incorporated by reference in its entirety to provide continuity of disclosure.

BACKGROUND OF THE INVENTION

Field of the Invention

The present invention relates to lifting devices and outdoorsman vehicle equipment. More specifically, the present invention pertains to a new lifting assembly for a vehicle that is capable of lifting heavy loads, supporting assemblies, and providing assistance to hunters, workers, and outdoorsmen.

Lifting heavy objects and transporting the same is a common chore for hunters, outdoorsman, and outdoor workers. Physically lifting objects is tedious, opens one up to the dangers of bodily injury, and in some instances is not even a possibility given the size of the object needing transport. The present invention pertains to a novel lifting apparatus attachable to a vehicle that is particularly suited for heavy objects and for lifting using a versatile lifting frame attachment, where the apparatus can be readily modified to adjust to different types of load and used in various applications.

One such activity is lifting large game animals. Large game animals can weigh several hundred pounds, making manual lifting for even a team of hunters practically impossible. Lifting such a heavy load is also not healthy for a hunter who may not be traveling with assistance. Pulling a muscle or throwing out one's back while in the wilderness can be dangerous circumstance that could endanger the hunter if he or she is unable to mount the vehicle and leave the area. Therefore, a mechanical assistant device is desired for loading and carrying a large game animal onto a vehicle used to reach the hunting grounds.

Lifting working equipment, such as construction, lawn care, and other outdoor work activity equipment is yet another activity requiring a lifting device. It is a regular occurrence for a homeowner or professional worker to encounter equipment or supplies that need transport from one location to another. If a dedicated lifter vehicle is not present, it can be difficult to load a pickup truck to transport the material or physically carry the same from one location to another. Therefore, a mechanical lifting assembly that can be supported by a common vehicle is desired, whereby the homeowner or worker is not required to purchase a dedicated lifter.

Supporting work tools in operation from a vehicle is another activity in which a mechanical lifting apparatus is well suited. Operating heavy equipment, such as construction equipment or landscaping equipment by hand is not always efficient, as the handler can become fatigued over a period of extended use. A modular support from a vehicle is preferred, whereby the equipment can be operated from within the vehicle and without physically handling the same. This allows the operator to use the equipment longer, and allows others who may not be physically suited to do the same using the mechanical advantage of a vehicle support.

Lifting devices attachable to all-terrain vehicles (ATVs) and other utility vehicles are present in the prior art, and mostly relate to single-application devices having a defined lifting tray. The present invention pertains to a dual-rail lifting apparatus for improved lifting capacity, where the device further supports a modular array of lifting attachments for applications to suit the end user. The device is suitable for lifting and transporting materials and dead weight, as well as supporting actively operating equipment. Overall the device transforms a general utility vehicle (all-terrain vehicle, pick-up truck, or the like) into a general lifting vehicle suitable for many different applications and environments.

Description of the Prior Art

Devices have been disclosed in the prior art that relate to lifting devices for various vehicle types. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,626,748 to Homer, Sr. discloses a wild game hoist and carrier device that is attachable to an all-terrain vehicle. The device comprises a rack for supported the game in a horizontal position, a vertical support, a hoist, and a gambrel for suspending the animal carcass from the device and above the ground. The hoist is a vertical member having a winch for suspending the game from the ground, while the vertical support can be positioned against the ground surface for preventing the vehicle from tipping or its suspension from compressing. While disclosing a lifting device for an all-terrain vehicle, the Homer, Sr. device relates only to a game lifter. The present invention comprises a two-rail modular lift system for a vehicle having a trailer hitch.

U.S. Pat. No. 6,155,771 to Montz discloses another game hoist from an all-terrain vehicle. The Montz device comprises a hoist that is adapted to rotate a horizontal boom in 360 degrees and telescope vertically. The device includes a winch and rope, along with a base plate that telescopes downward for placement against a ground surface when in a working state. The base plate acts as a ground support that bearing against the ground when deployed, while acting as an elevated support when retracted upwards. The Montz device, similar to the Homer, Sr. device, offers a single-rail game carrier rather than a dual rail lifting apparatus.

U.S. Patent Publication No. 2005/0254925 to Braquet discloses a lift assembly for an all-terrain vehicle, wherein the device includes pivotable platform that can be raised and lowered from a pivot assembly to lift larger items. A hoist is utilized to pivot the platform from a lowered position to an elevated position for lifting object. The Braquet device, while disclosing a lifting apparatus for an all-terrain vehicle, fails to disclose the structure of the present lifting apparatus.

Finally, U.S. Pat. No. 7,575,120 to Beatty provides an ATV hoist that is secured to an ATV. The hoist includes a base arm and a sliding arm that allows for extension of the hoist, wherefrom a cable and cable hook is suspended. The Beatty device is useful for lifting a load vertically using an angled lifting boom. The present invention pertains to a heavy lift and support assembly having a dual rail frame for lifting objects along the rail frame in a vertical plane, whereby an attachment provides support for articles rather than a direct hoist connection.

The articles in the prior art describes various lifting booms, frames, and hoists that allow a user to lift a heavy object using an all-terrain as a vehicle for transport. While these devices share a common theme, the present invention is divergent in that it provides a vertical lifting frame that is adapted to support a plurality of subframes. The subassemblies support different types of objects depending on the given application, including large game animals, people engaged in hunting or working, material for construction or yard work, and even active tools that can be operated while thereattached.

It is submitted that the present invention is substantially divergent in design elements from the prior art, and consequently it is clear that there is a need in the art for an improvement to existing all-terrain lifting devices. In this regard the instant invention substantially fulfills these needs.

SUMMARY OF THE INVENTION

In view of the foregoing disadvantages inherent in the known types of vehicle-attachable lifting device now present in the prior art, the present invention provides a new lifting assembly that can be utilized for providing convenience by allowing for many different subassembly attachments to the device, wherein lifting activities and tool support is possible without physically handling the same.

It is therefore an object of the present invention to provide a new and improved vehicle lifting device that has all of the advantages of the prior art and none of the disadvantages.

It is another object of the present invention to provide a vehicle lifting device that utilizes a dual, upright rail system that supports a movable lifting frame within the rails to control an article lifter or a tool support from an all-terrain vehicle.

Another object of the present invention is to provide a vehicle lifting device that utilizes a modular construction that is adapted to accept different lifting devices and tool supports.

Yet another object of the present invention is to provide a vehicle lifting device that can be operated by an electric winch without requiring manual input from the vehicle operator.

Another object of the present invention is to provide a vehicle lifting device that can be deployed in a plurality of situations and environments where lifting heavy loads, support for an individual or material is necessary, or support for a power tool is required.

Yet another object of the present invention is to provide a vehicle lifting device is to provide a powered lifting device that is preferably powered by an electric winch, however another alternative configuration includes an assembly using hydraulic movement.

Another object of the present invention is to provide a vehicle lifting device that may be readily fabricated from materials that permit relative economy and that are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
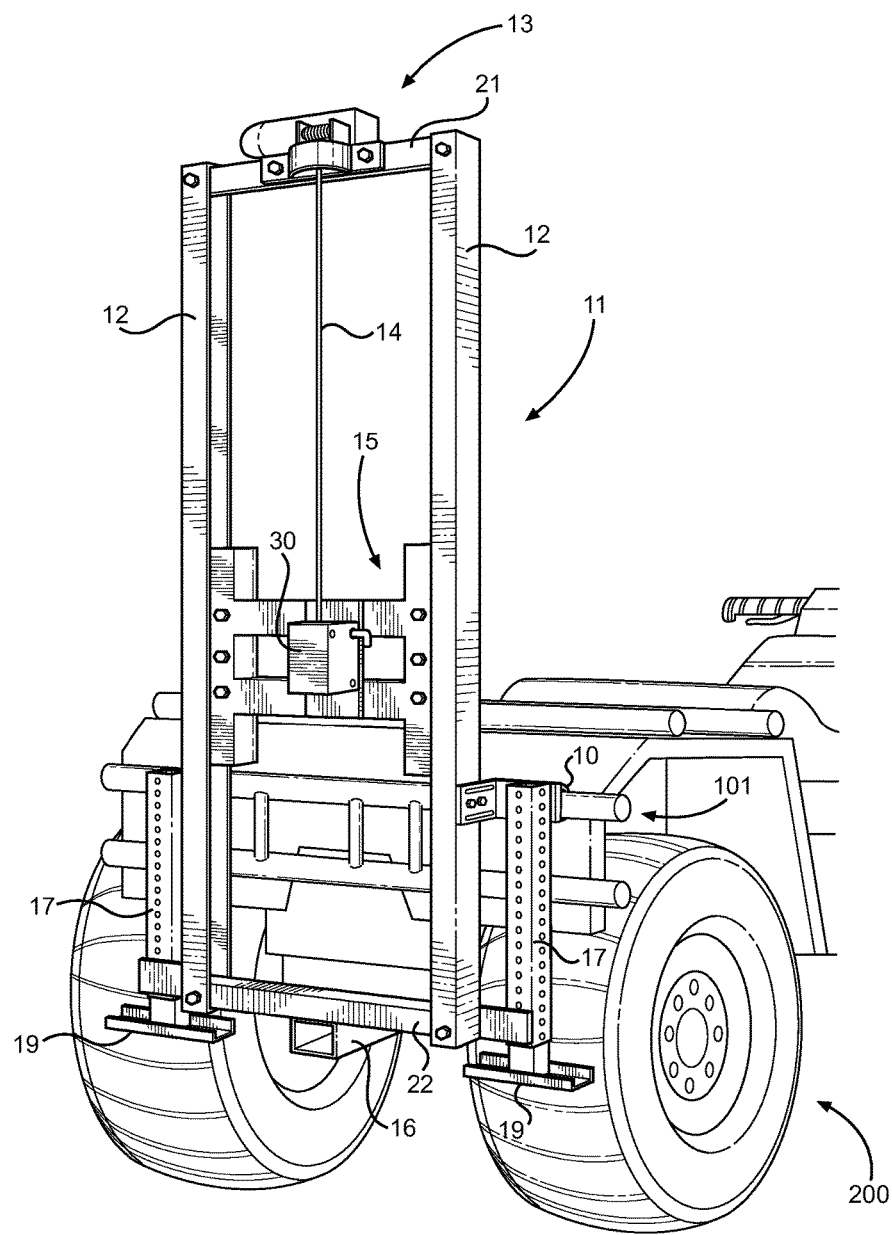
FIG. 1 shows a perspective view of the dual-rail frame of the present invention in a working state, attached to an all-terrain vehicle.

Reference is made herein to the attached drawings. Like reference numerals are used throughout the drawings to depict like or similar elements of the vehicle-attached lifting device. For the purposes of presenting a brief and clear description of the present invention, the preferred embodiment will be discussed as used for supporting different material lifting and tool support assemblies from a vehicle. The figures are intended for representative purposes only and should not be considered to be limiting in any respect.

Figure 2:
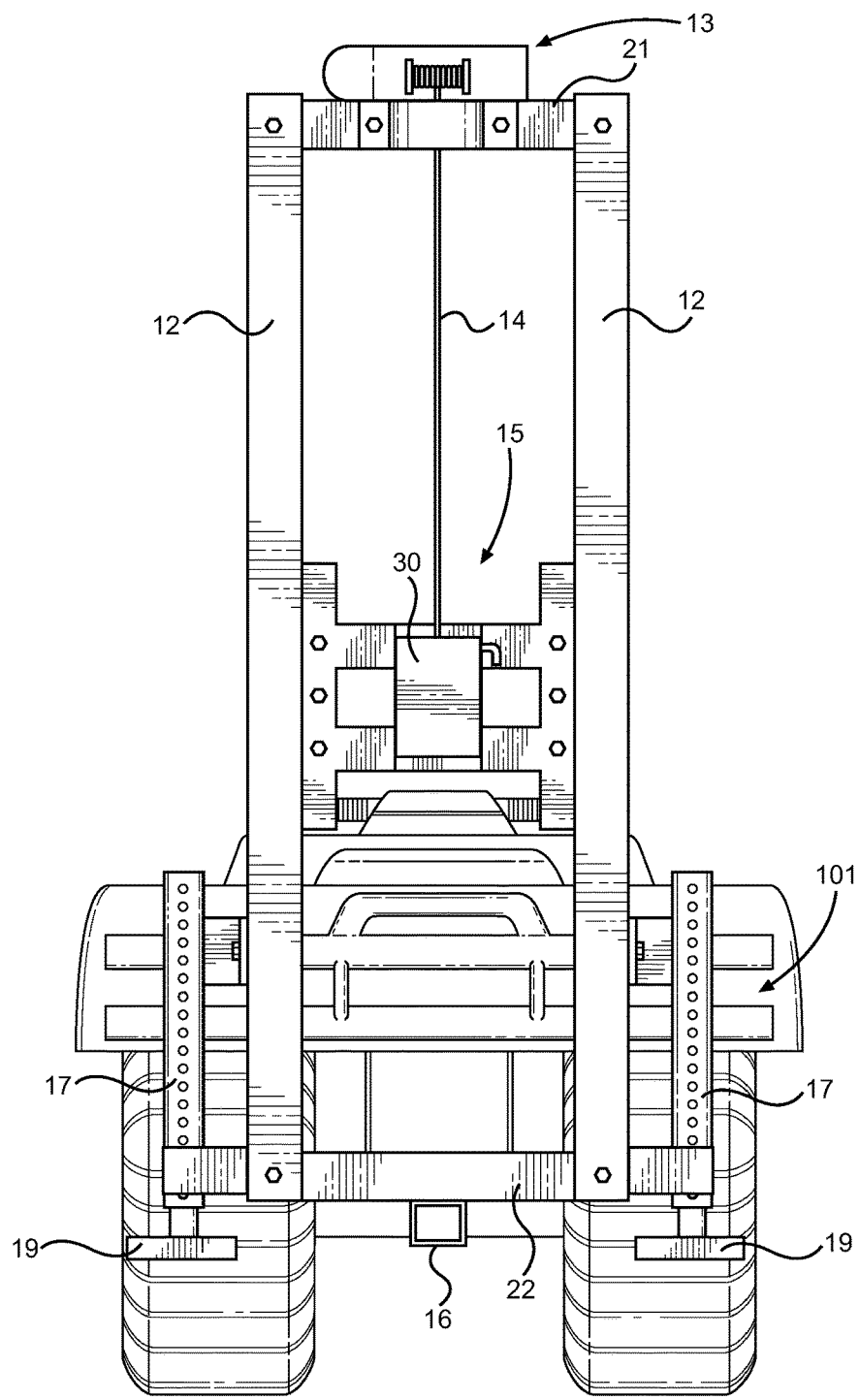
FIG. 2 shows a frontal view of the dual-rail frame of the present invention, the frame not yet attached to a lifting or tool support subassembly.

Referring now to FIGS. 1 and 2, there are shown views of the lifting device of the present invention in a non-working state. The device comprises an upright, dual-rail support frame 11 that comprises a substantially rectangular construction supported from the rear of an all-terrain vehicle 200. A first and second upright rail 12 and an upper 21 and lower 22 rail form a support for an internal subassembly frame 15 that is adapted to support a lifting or tool support subassembly therefrom. The internal subassembly frame 15 is supported along its sides within the upright rails 12 and is vertically controlled by an actuation means, which preferably comprises a winch 13 and cable 14, wherein the winch is electrically driven to control the vertical position of the subassembly frame 15 and thus a supported subassembly therefrom.

The subassembly frame 15 includes a sleeve member 30 and securement means (e.g. a latch or fastening means) that is adapted to support a lifter subassembly or tool support subassembly therefrom. In this way, the frame 15 provides a generic support while the dual-rail support frame 11 can be deployed for supporting articles in different situations and environments. A number of different applications are contemplated, including various outdoor activities, construction work, landscaping work, general lifting and transport of articles, and various applications in which a tool is supported.

The support frame 11 is supported from the all-terrain vehicle 200 by a first and second vehicle attachment means, whereby the frame 11 is secured to the vehicle by a rear vehicle frame 101 and via a trailer hitch receiver. The support frame 11 includes clips that secure to the vehicle frame 101 by way of a fastened connection or U-bolt connection 10. Along the base of the support frame 11 is an elongated trailer hitch member 22 that is accepted by the trailer hitch receiver, whereby the base of the frame 11 is supported as well as the midsection thereof for a secure connection of the frame 11 to the vehicle 200.

During operation, the device supports a lifting or tool support subassembly in a movable fashion, whereby the load being supported (material load, personnel, or tool weight) is transferred to the vehicle by way of its midsection connection 10 and its trailer hitch connection 22. To prevent the vehicle 200 from tipping while lifting particularly heavy loads, and to prevent the vehicle's suspension from compressing, a pair of ground support members 19 are provided along the sides of the frame 11. These members 19 extend downward from within sleeves 17 and act as a ground pads and ground supports for the frame 11 and its supported load. The weight of the supported load is therefrom transferred to the ground rather than to the vehicle's suspension, improving lift capacity and stability of the assembly during operation. The support members 19 are pinned assemblies or alternatively may be jack screws that extend using a threaded internal member.

Figure 3:
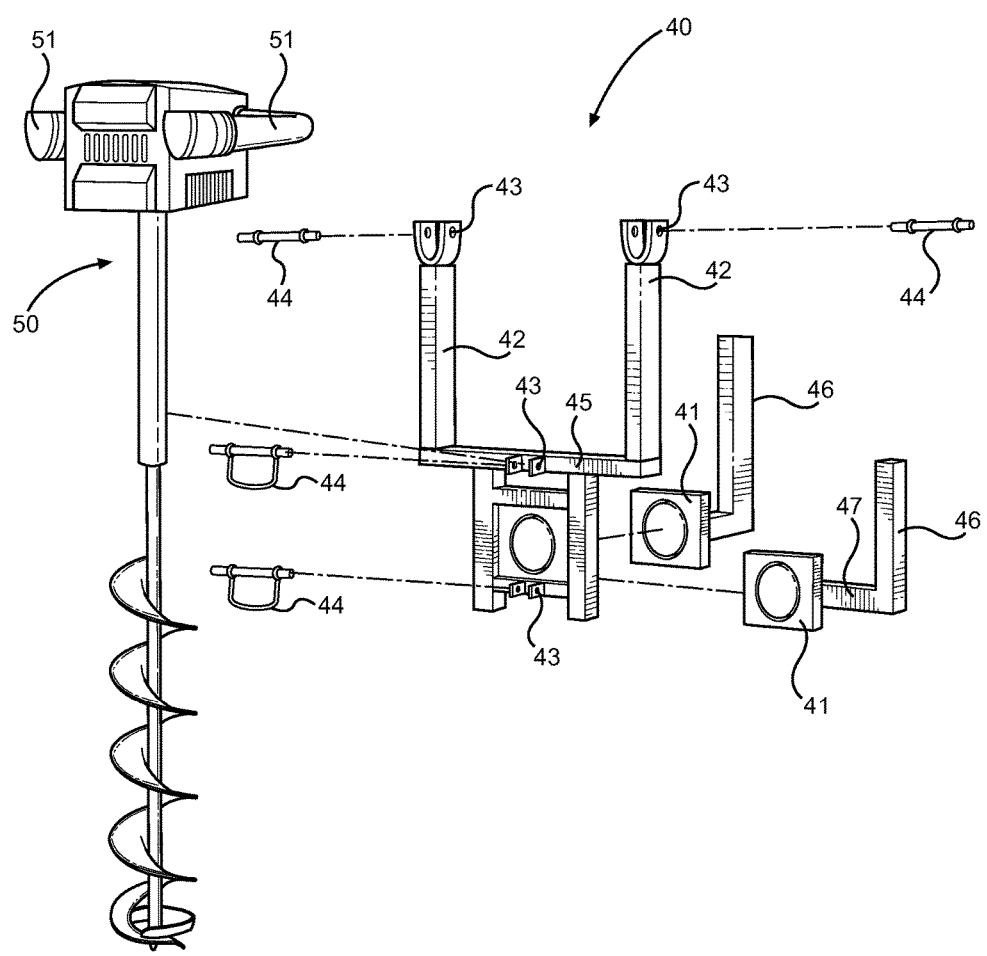
FIG. 3 shows an exploded view of an embodiment of the tool support subassembly, wherein an auger tool support frame is provided.
Figure 4:
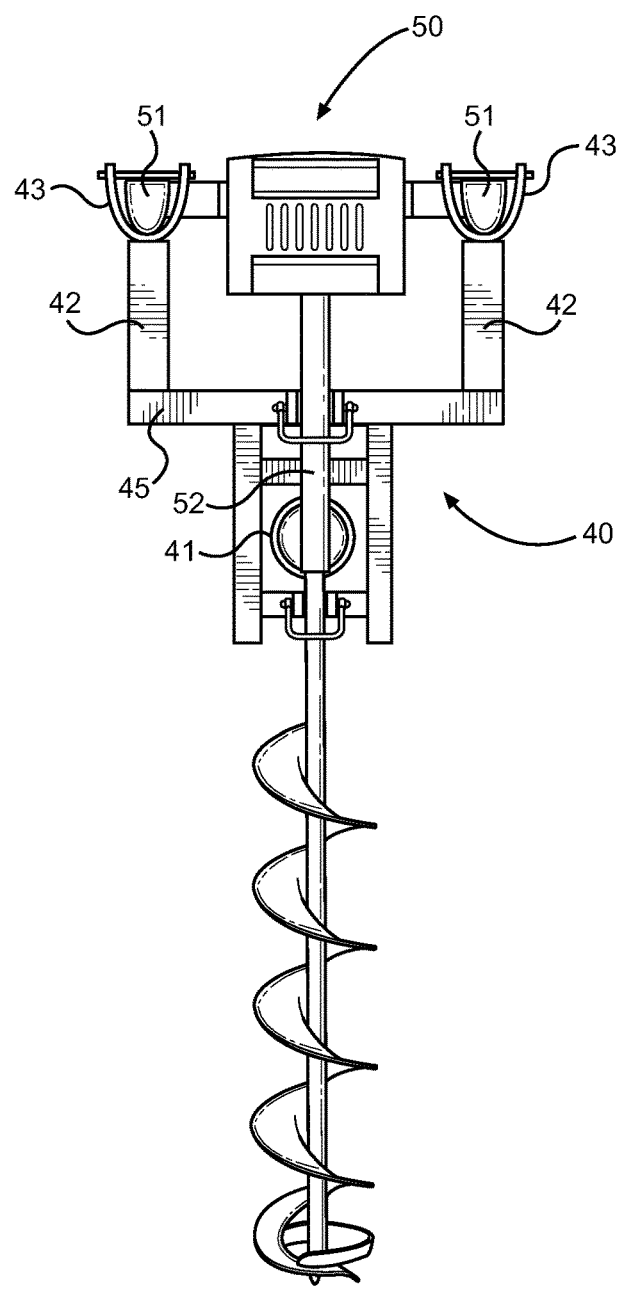
FIG. 4 shows a frontal view of the auger tool support frame subassembly.

Referring now to FIGS. 3 and 4, there are shown views of an embodiment of the tool support subassembly that is adapted to be supported by the dual-rail frame. In this embodiment, an auger tool support frame 40 is provided. The device comprises a pair of upstanding arm portions 42 connected to a horizontal member 45 that establishes a U-shaped support for an otherwise handheld auger device 50. The handles 51 of the auger 50 are supported by brackets 43 along the U-shaped frame, wherein the handles 51 and auger blade support 52 are supported in a static position that allows for auger operation while thereattached. To maintain the auger's 50 position, a series of clamps 44 and pins may be deployed to retain the tool 50 on the support 40.

Figure 5:
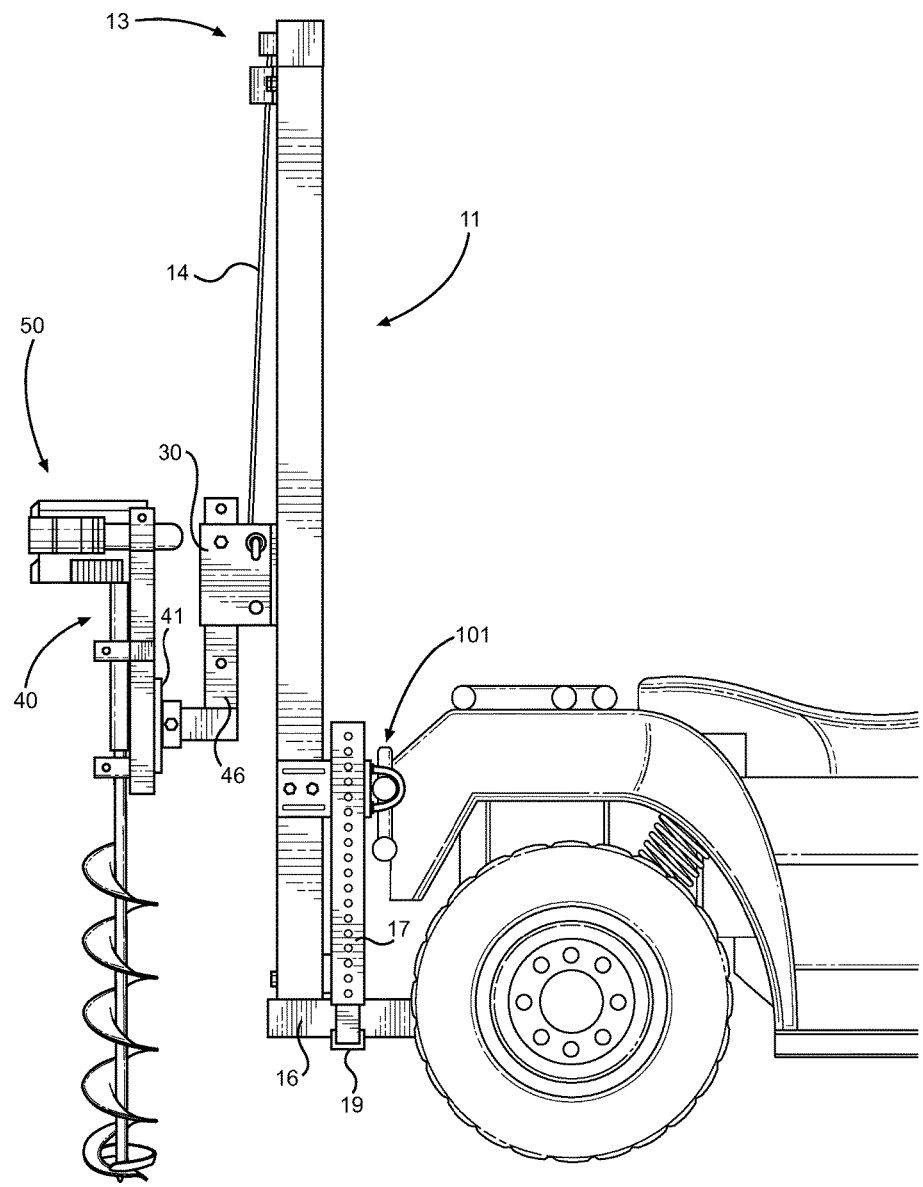
FIG. 5 shows a side view of the auger tool support frame subassembly be supported by the dual-rail frame from the all-terrain vehicle.

Referring to FIGS. 3 through 5, the connection between the auger support subassembly 40 and the support frame 11 preferably comprises a pivotable connection. A rotational joint 41 is provided at the interface between the auger frame 40 and an L-bracket 46 connected to the sleeve 30 of the support frame 11. When connected to the sleeve member 30, the auger frame 40 can be lifted vertically within the frame 11 limits by the winch 13 and cable 14 system. The rotational joint 41 allows the auger frame 40, and thus the direction of the auger 50 working end, to be adjusted for different working angles and ground approaches while in operation. When in operation, load from the auger 50 is transferred to the auger frame 40 to the dual-rail frame 11, which in turn transmits load to the vehicle support frame 101 and the trailer hitch receiver connection 2. Alternatively, the ground support members 19 can be extended to relieve much of the burden from the vehicle and support the auger 50 from the ground. The L-bracket 46 is adapted to be positioned directly behind the rotational joint 41 or can be shifted 47 to one side for off-center tool support from the dual-rail frame 11.

Figure 6:
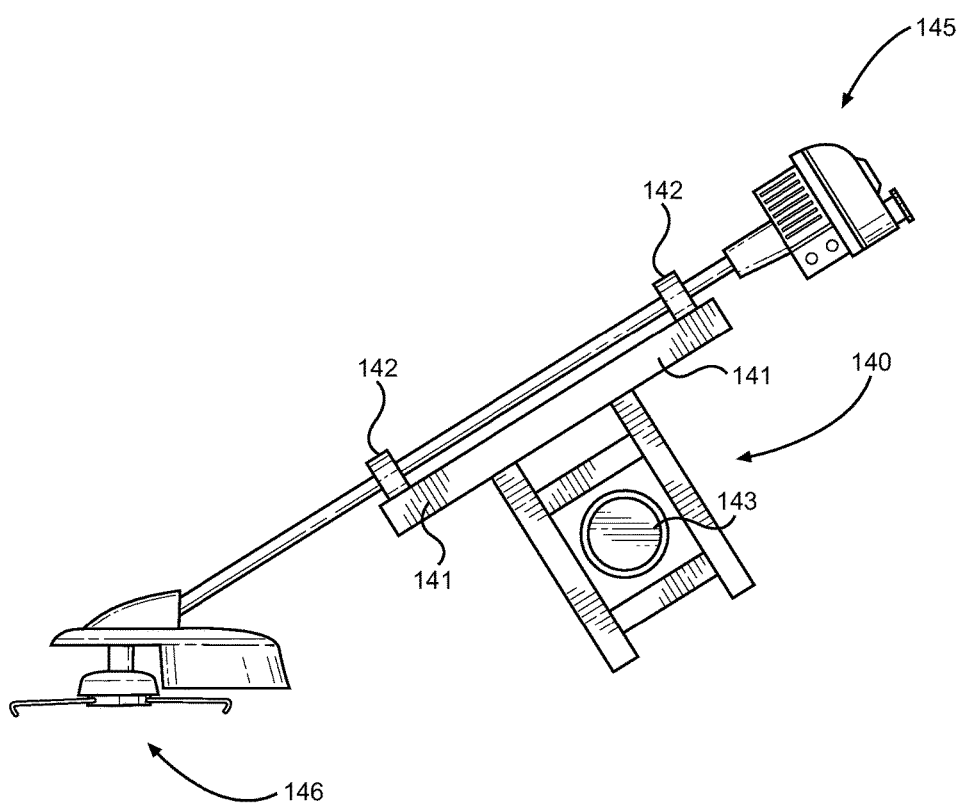
FIG. 6 shows a frontal view of a lawn care tool support subassembly.

Referring now to FIG. 6, there is shown a subassembly that contemplates supporting a lawn care tool such as a weed whacker tool 145. The subassembly is much like the auger support, however the device comprises a tool support frame 140 having a central rotational joint 143 and an upper portion 141 that attaches to the body of the weed whacker 146 using appropriate attachment members 142. In this way, the weed whacker 145 is supported from the subassembly 140 and thus from the vehicle without requiring the user to manually handle the device 145. The working end 146 of the weed whacker can be positioned against the ground while the operator controls the vehicle location across a yard.

Figure 7:
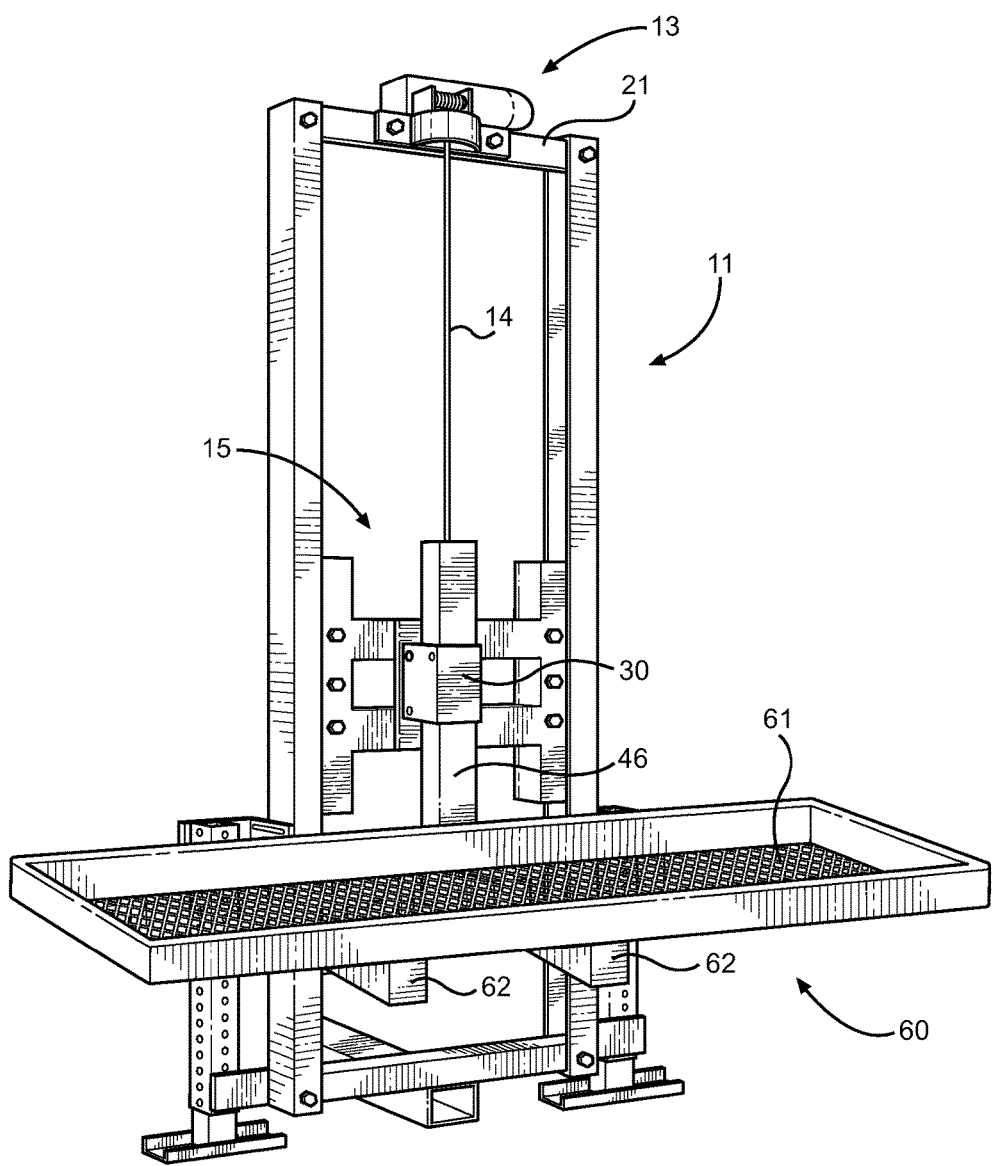
FIG. 7 shows a view of the lifting platform subassembly that is attachable to the dual-rail frame of the present invention.

Referring now to FIG. 7, there is shown a platform subassembly 60 embodiment that comprises an elongated platform 61 for supporting articles of construction, workers, and material from the support frame 11. The platform 61 is connected to a pair of elongated support members 62 from below, which connect to an upright member 46 that secures into the sleeve member 30 of the movable internal subassembly frame 15 of the present invention. Upright member 46 is pinned or otherwise fastened to the sleeve 30 to secure the same and ensure a stable connect when lifting particularly heavy loads. In operation, the platform 61 can be adjusted up and down by way of the winch 14 and cable 14 system within the upright frame 11, wherein the platform 61 can be lowered to the ground and lifted high above the ground for loading and unloading purposes.

Figure 8:
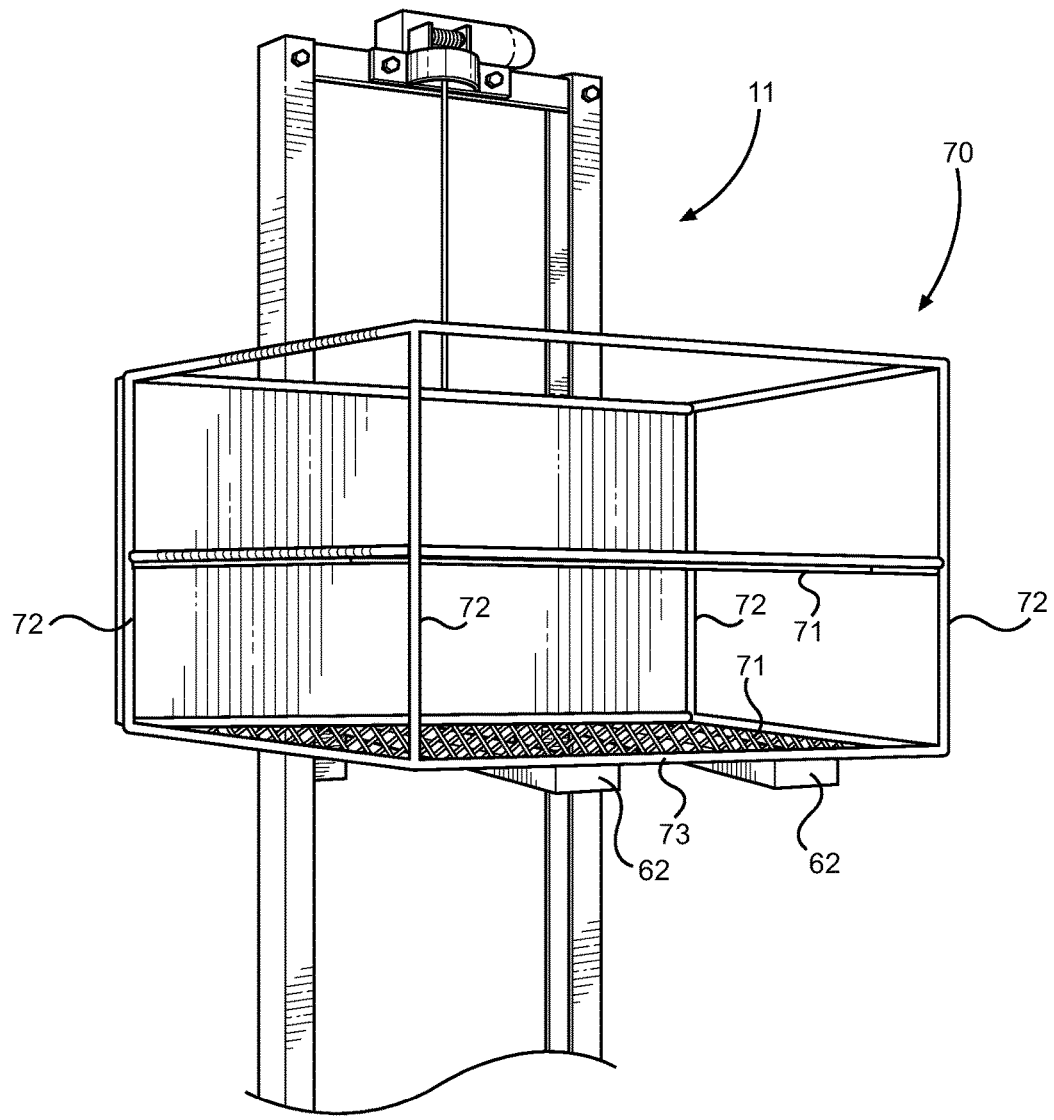
FIG. 8 shows a view of the hunter basket or worker platform subassembly that is attachable to the dual-rail frame of the present invention.

Referring now to FIG. 8, there is shown a lifting basket subassembly 70 embodiment of the present invention, which comprises an elongated platform 73, upstanding railings 72, and an internal step 71. The lifting basket 70 can be used to lift a worker to an elevated position for engaging a work piece or conducting a given operation. The basket railings 72 protect the worker from falling therefrom, while the internal step 71 allows the user to engage higher locations when in the basket 70. Similar to the platform subassembly, the basket embodiment 70 is supported by the internal frame of the dual-rail frame 11, which controls the vertical positioning of the basket 70 when thereattached.

Figure 9:
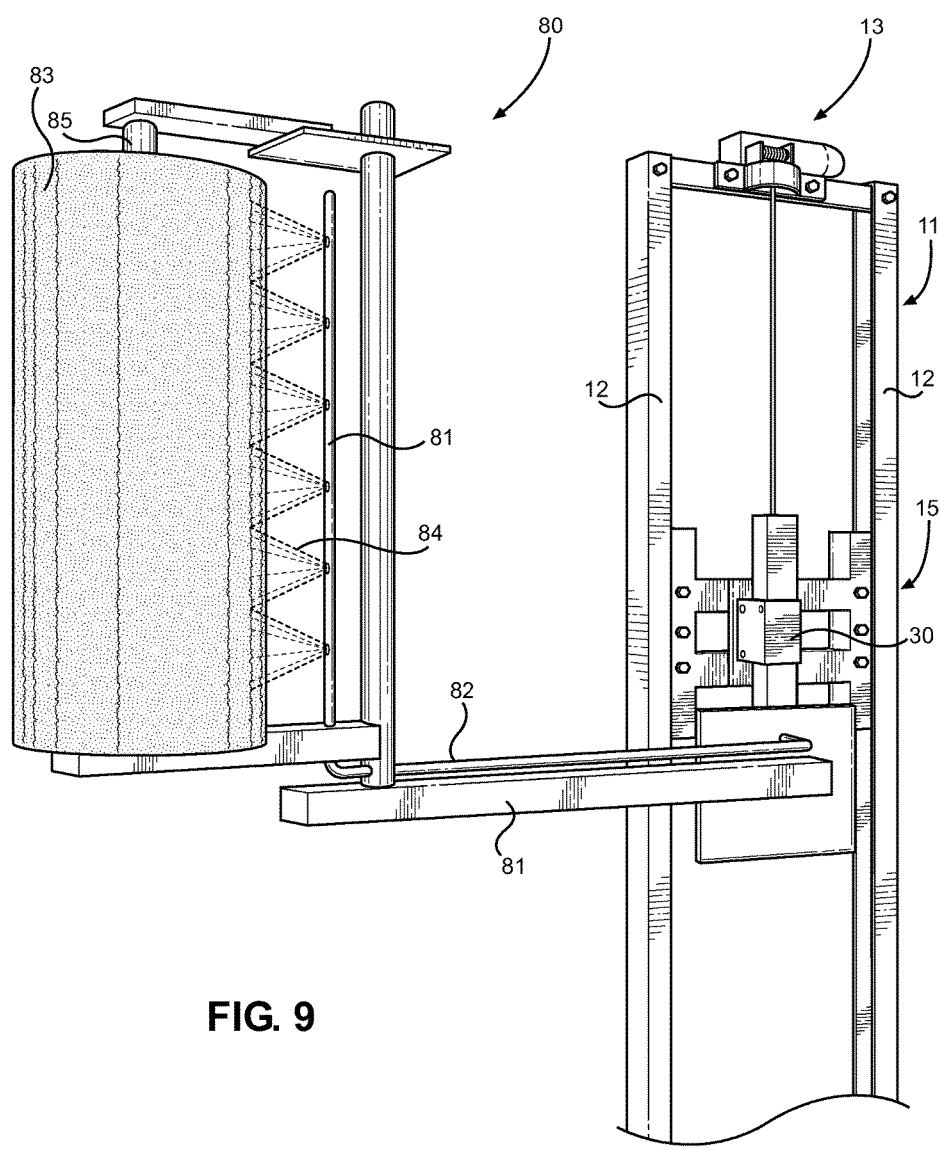
FIG. 9 shows a side view of a lifting and unloading platform subassembly that is capable of supporting and then unloading a load from the device.

Referring now to FIG. 9, there is shown an embodiment of the platform subassembly that comprises a rotatable platform 161 that is useful for supporting heavy load and unloading the same into another vehicle bed or onto the ground surface without having to handle the same. This embodiment 160 contemplates a platform frame 162 within which a rotatable platform 161 is positioned while at rest. Connected to the rotatable platform 161 is a tether 163, which is supported by an overhead pulley 164 and winch 165 along an overhead member 167. Manipulation of the tether 163 rotates the platform 161 about its rotational joint 168 connection with the platform frame 162. The platform frame 162 is further connected to the dual-rail frame 11 by way of an upstanding member 166 connected to the sleeve member 30 thereof. In operation, the user can lower the platform 161 to the ground, load it with articles (hunted animals, material, etc.), lift the platform and load, and then unload the same using the rotatable platform configuration.

This allows for loading items into areas above the ground (i.e. a pickup truck bed or the like).

Figure 10:
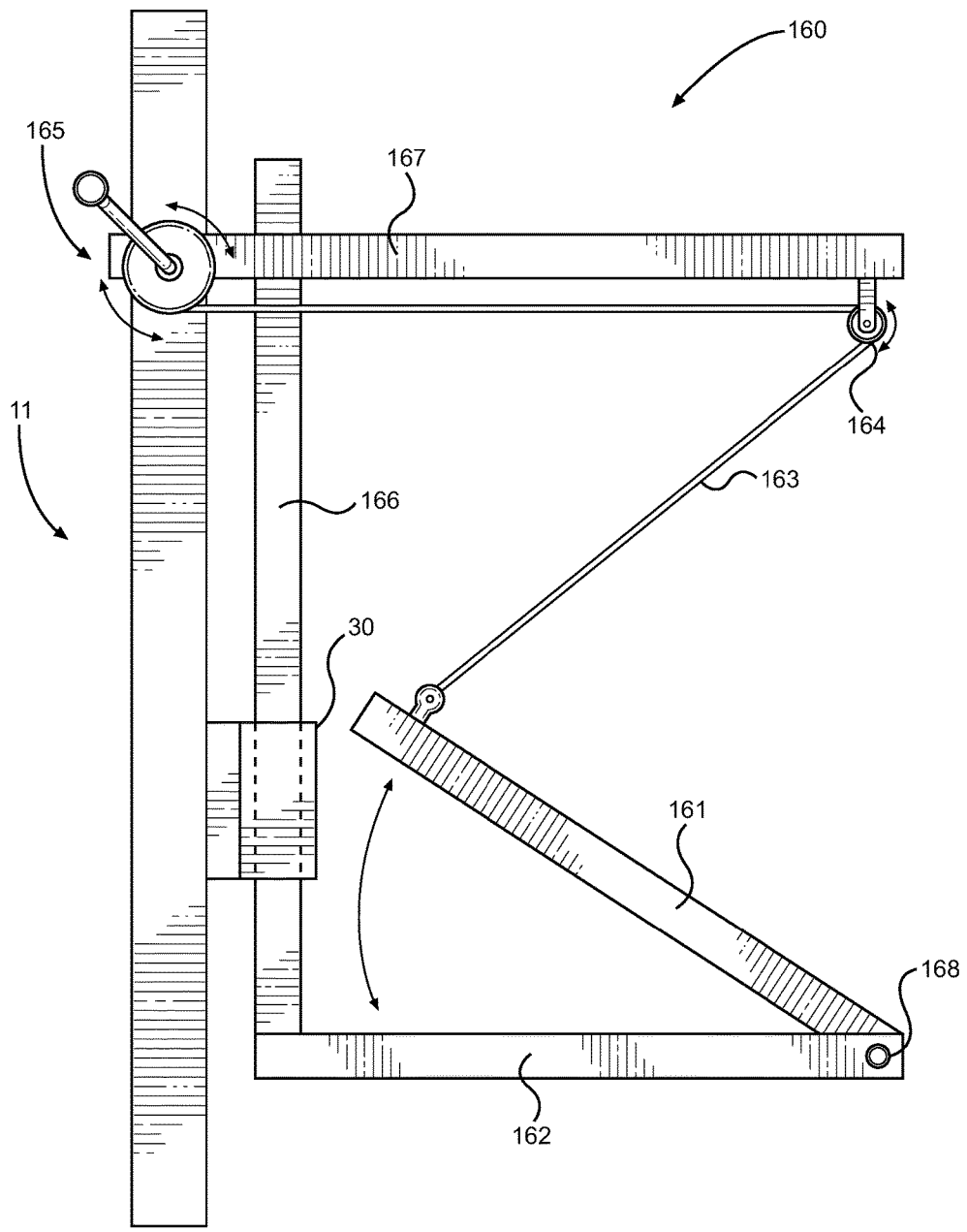
FIG. 10 shows a view of the surface cleaner subassembly that is attachable to the dual-rail frame of the present invention.

Referring now to FIG. 10, there is shown a view of a surface cleaning subassembly 80 that is affixable to the internal subassembly frame 15 of the present invention. In this embodiment, the subassembly comprises a cleaning roller 83 that is positioned on a spindle 85 and supported in an extended position from the support frame 11. The roller 83 may be powered by an electric motor, while a liquid conduit 82 having a plurality of nozzles can be utilized to wet the roller 83 during operation. This attachment is well suited for cleaning walls and other surfaces while driving along the same within the vehicle. The roller 83 is supported by an arm extension member 81, which is affixed to a plate that connects to the attachment sleeve 30 of the internal frame 15. The frame 15 is raised and lowered within the device to clean different portions of a wall surface, whereby the winch 13 controls the roller 83 location within the limits of the frame rails 12.

Figure 11:
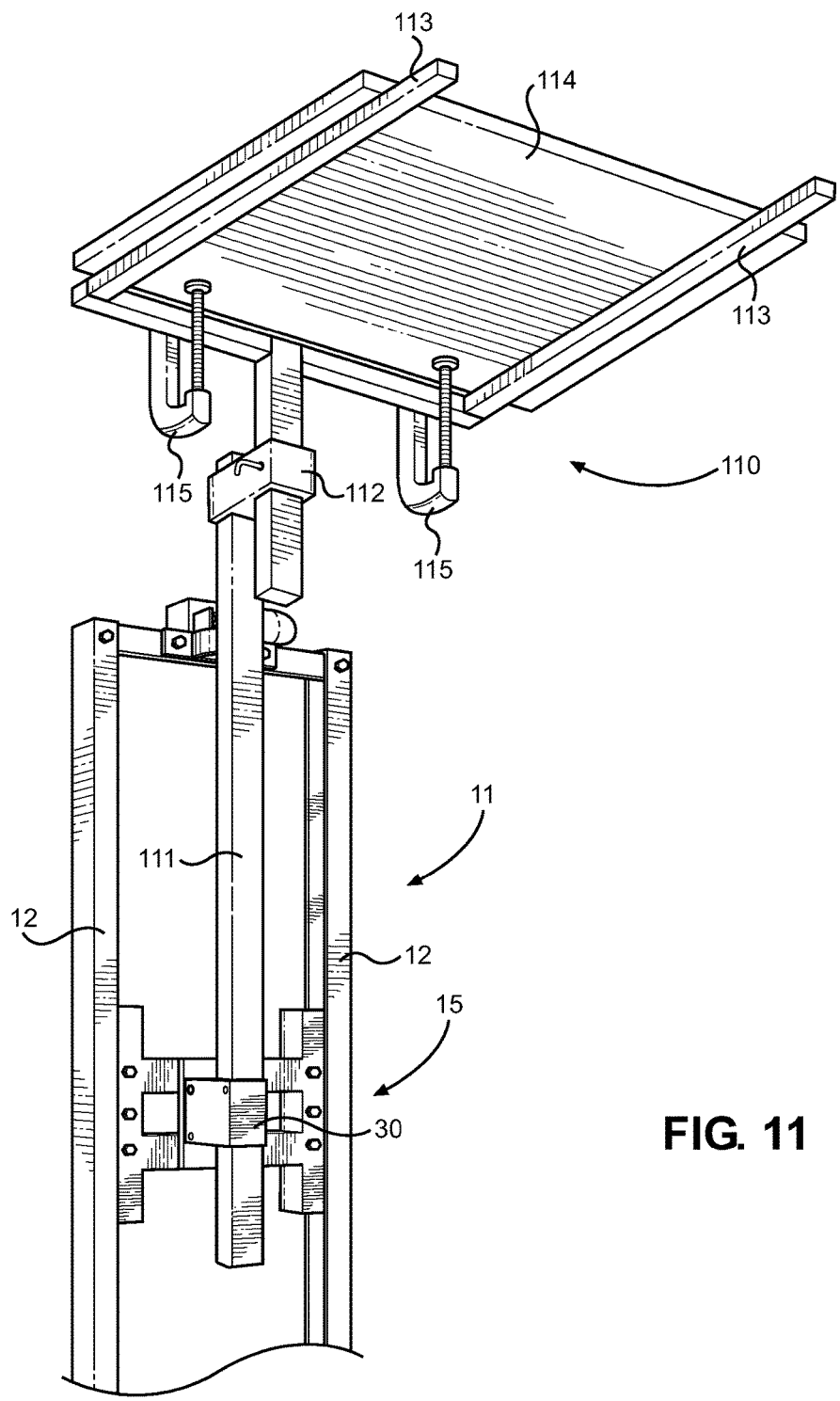
FIG. 11 shows a view of the street sweeper subassembly that is attachable to the dual-rail frame of the present invention.

Referring now to FIG. 11, there is shown a similar cleaning subassembly as in FIG. 8; however, this embodiment contemplates a street or ground cleaning subassembly 90. The subassembly 90 comprises a ground cleaning roller 91 having an elongated body that is supported on a spindle and U-shaped support 93. The roller 91 is preferably powered by an electric motor, which imparts a rotation thereto, while the spindle support 93 connects to the internal frame 15 of the present invention using an L-shaped bracket and a member adapted to be received by the attachment sleeve 30. Similar to the wall cleaning embodiment, the ground cleaning embodiment is moveable upward and downwards using the winch 13 and cable system within the limits of the frame rails 12.

Figure 12:
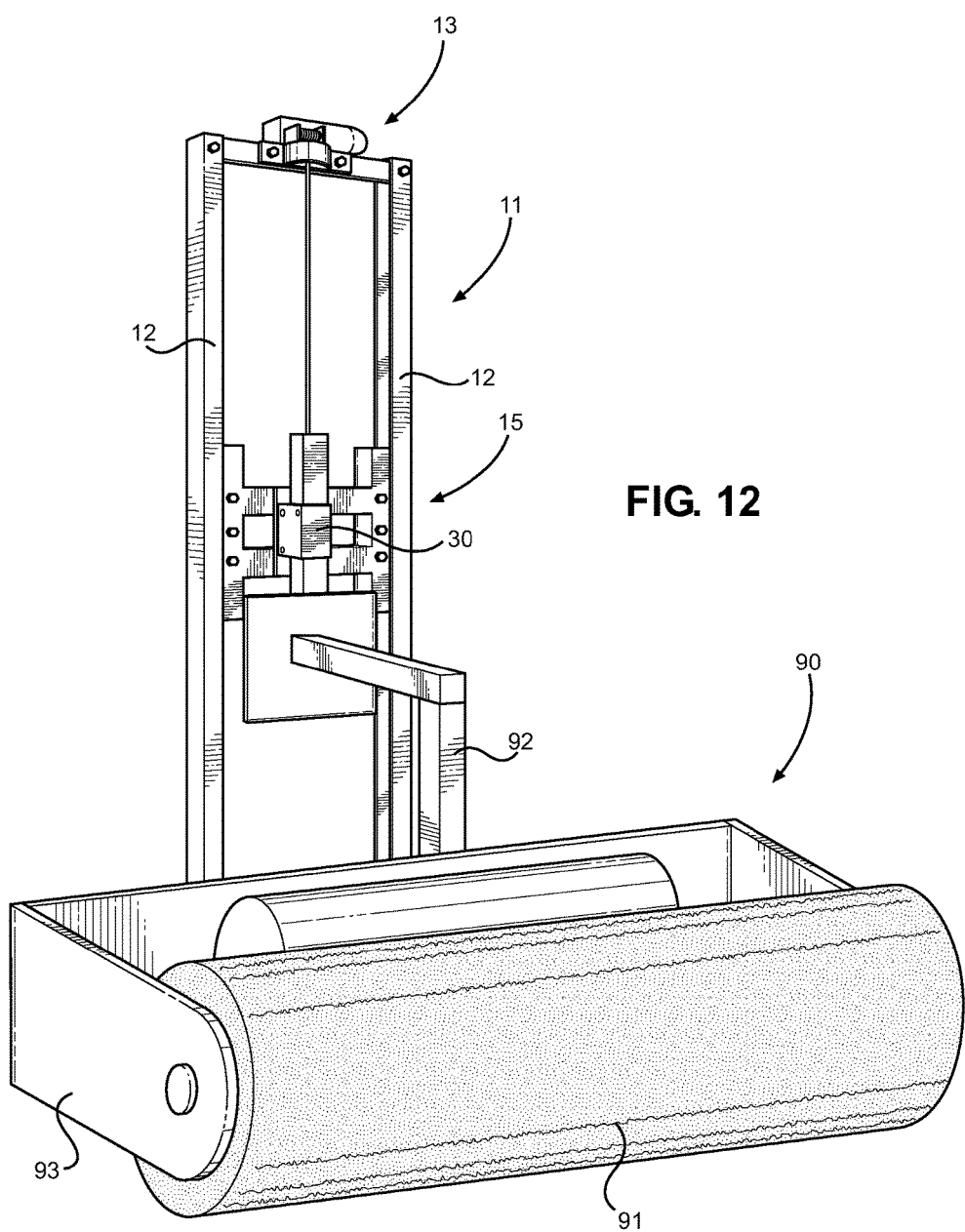
FIG. 12 shows a view of the elevated support jib subassembly that is attachable to the dual-rail frame of the present invention.

Referring now to FIG. 12, there is shown a view of an overhead support subassembly 100 that is attachable to the dual-rail frame 11 of the present invention. The subassembly 100 comprises an elongated, L-shaped overhead support that includes a number of attachable segments 101 that extend the jib high above the ground. The assembly comprises a first section 101 that secures to the sleeve 30 of the internal frame 15, wherein the upper portion of the first segment terminates at a junction 102 that can secure a second segment 101 thereto or the upper support portion of the device. The upper support portion comprises a vertical segment 103 and a horizontal jib segment 104 that supports an eyelet 105, hook or pulley device. The eyelet 105 (or pulley/hook) is positioned outward from the frame 11 such that a lifting line can be fed therethrough. In this way, the device operates as a means of positioning a tether support or lifting line support above the ground, or additionally for supporting a tethered object in an elevated position. The subassembly 100 can be raised and lowered as required by way of the winch and cable system.

Figure 13:
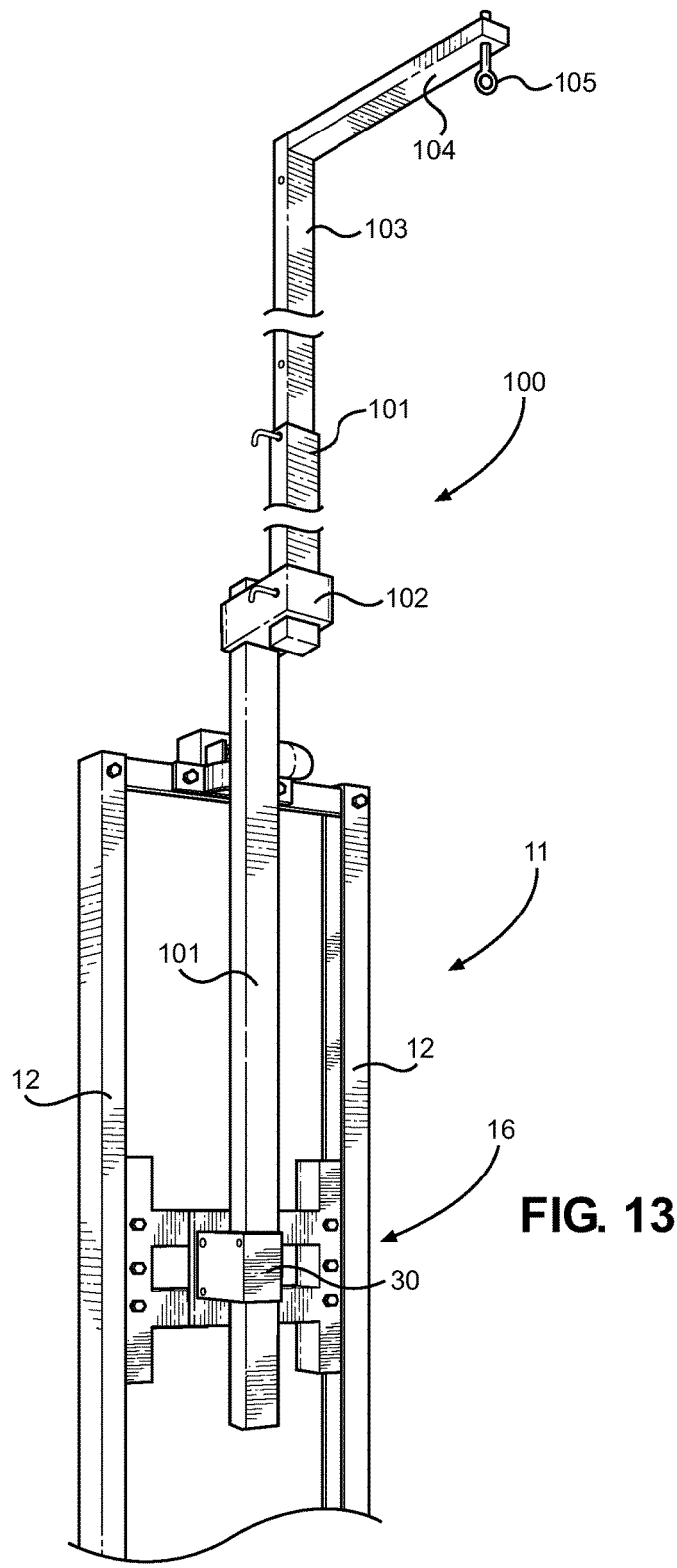
FIG. 13 shows a view of the elevated support jib subassembly in which the jib is rotatable about a rotational joint.

Referring now to FIG. 13, there is shown a view of the overhead support subassembly in which the upper support 104 is rotatably supported by way of a rotational joint 108. The joint 108 comprises a bearing assembly that allows the support 104 to swing freely in a horizontal plane, wherein a tether can be supported therefrom for rotatably supported loads. The overhead support 104 height is determined by the number of segments 101 and junctions 102 deployed from the dual-rail frame, which increases the height of the overhead support 104.

Figure 14:
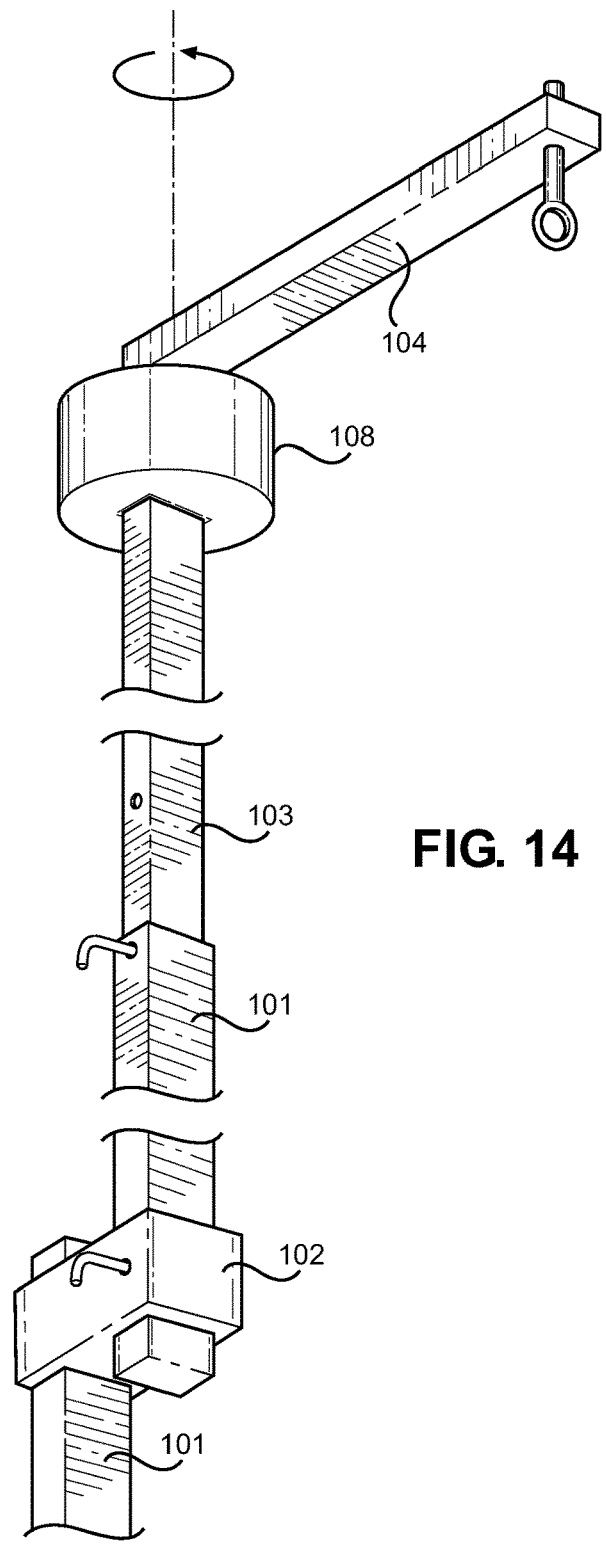
FIG. 14 shows a view of another elevated support subassembly that is attachable to the dual-rail frame of the present invention.

Referring finally to FIG. 14, there is shown a material lifter embodiment 110 of the attachable subassembly. In a similar fashion as the overhead support subassembly, this embodiment contemplates an elevated support for elongated material 114, such as plywood, drywall, or pallets of material. Along with several segments 111 that are supported by the sleeve 30 of the internal frame 15, there is an upper portion that comprises a first and second horizontal member 113 forming a U-shaped support under a flat material 114. Similar to the overhead support subassembly, there is provided junctions 112 for extending the height of the support by connecting multiple segments 111. As with previous subassemblies, this embodiment is lifted and lowered by way of the dual-rail frame 11 and its movable internal frame 15. The internal frame 15 can be raised and lowered within the extents of the frame rails 12.

Figure 15:
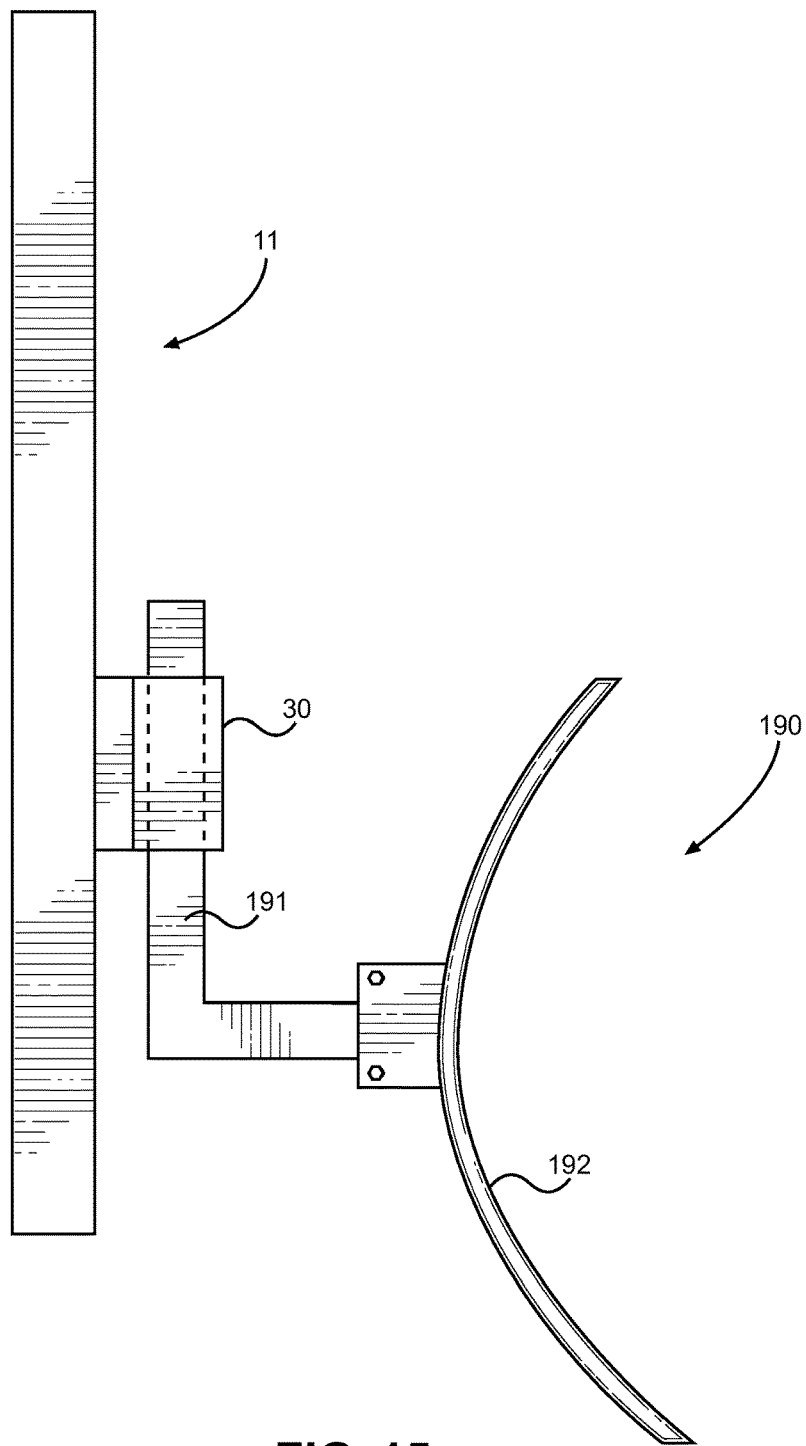
FIG. 15 shows a side view of a plow subassembly embodiment.

Referring now to FIG. 15, there is shown a plow subassembly 190, which is attachable to the dual-rail frame 11 by way of the support sleeve 30. The plow subassembly 190 comprises an arcuate plow blade 192 for plowing snow or other debris, which is supported by a plow arm 191 attachable by way of the support sleeve 30. In this way, the attached vehicle is converted into a snow plow or material spreader vehicle.

Figure 16:
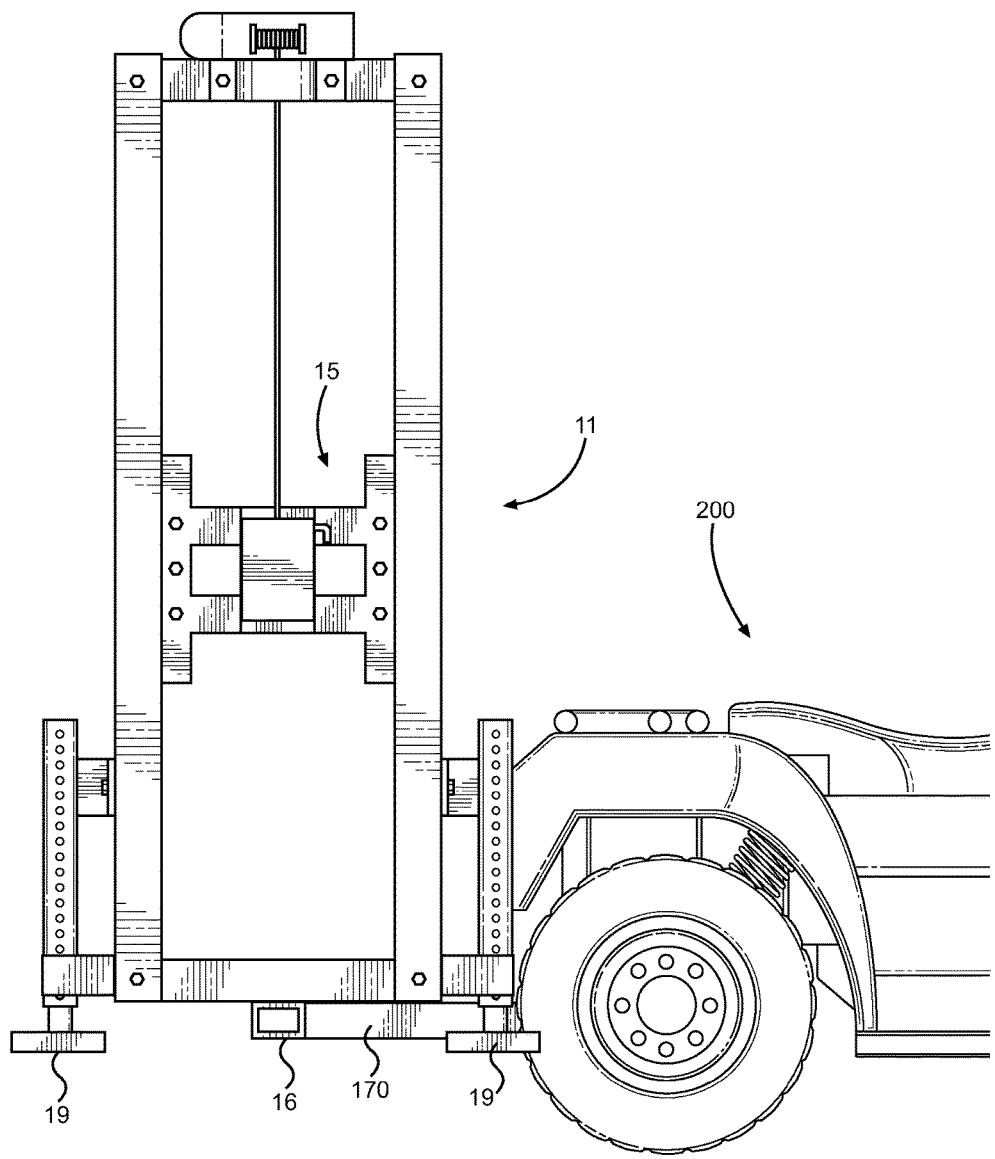
FIG. 16 shows a view of the dual-rail frame supported to the side of the attached vehicle by way of a T-junction or pivot joint connection to the vehicle tow hitch.

Referring finally to FIG. 16, there is shown a view of the dual-rail frame 11 of the present invention being supported at an angle with respect to the vehicle 200. It is contemplated that the dual-rail frame 11 can be supported from the vehicle trailer hitch alone and using different intermediate elements that promote versatility. Notably, a junction 170 or rotating arm can be supported by the trailer hitch and connected 16 to the base of the frame 11. A junction 170 may comprise a T-junction or L-junction, wherein the frame 11 is supported to the side of the vehicle 200. A rotating arm embodiment allows the frame 11 to be moved into a given position at different angles with respect to the vehicle. Still yet another configuration involves a second frame 11 supported by a first frame 11 attached to the vehicle 200. In this way, several winches are employed and the subassembly can be adjusted 15 at the upper frame rather than at the base frame. When to the side, the ground supports 19 can be used as with the original embodiment for support the load being lifted or the tool being utilized.

Overall, the dual-rail frame, its movable internal frame, and the various contemplated subassembly embodiments provide a number of different applications using a simple yet modular assembly in connection with a vehicle. The present invention transforms general utility vehicle into a tool-specific or task-specific vehicle that is capable of supporting various tools, lifting loads from the ground, or lifting objects or people high above the ground where separate vehicles is not required for each task.

It can be difficult for hunters, farmers, fishermen, campers, and other people to load things on a vehicle for transport from one location to another. People can possibly injure themselves trying to perform this task by themselves. Additionally, disabled people or people who lack arm strength may not be able to load, transport, and unload cargo by themselves, preventing them from possibly hunting, fishing, camping, or a variety of other outdoor activities. The present invention provides a lifting apparatus attachable to a vehicle, wherein material lifting and tool support is accommodated. Embodiments of the actuation means within the dual-rail frame include a winch and cable system, a hydraulic arm that lifts and lowers the internal frame, or a pneumatic system in place of the hydraulic system. The electrical or hydraulic systems can be controlled by onboard vehicle controls, or alternatively by a remote control system. For simpler applications with reduced loads, a hand crank and pulley system may be utilized in place of a powered winch.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle-attached lifting and tool support device, comprising:
    a substantially rectangular support frame having a first and second upright rail, and an upper and lower rail;
    an internal subassembly frame mounted within said support frame and slidable vertically therein along said upright rails, wherein said internal subassembly frame is configured to slide along an interior portion of said upright rails;
    an actuator configured to move said internal subassembly frame within said upright rails;
    a vehicle connector configured to secure said support frame to a vehicle;
    said vehicle connector comprising a trailer hitch mount configured to connect to a trailer hitch receiver on the vehicle;
    a sleeve member disposed on the internal subassembly frame in a vertical orientation, the sleeve member comprising an open upper end and lower end, said sleeve member configured to removably receive a connector of a subassembly therein in order to removably secure said subassembly to said internal subassembly frame;
    a first and second ground support member slidably mounted to said support frame, said ground support members configured to support the support frame against a ground surface;
    the internal subassembly frame disposed wholly between a boundary of the first upright rail, a boundary of the second upright rail, and a front face and a rear face formed by the rectangular support frame.

2. The device of claim 1, wherein said actuator comprises an electric winch and cable system.

3. The device of claim 1, wherein said actuator comprises a hydraulic arm.

4. The device of claim 1, wherein said actuator comprises a pneumatic arm.

5. The device of claim 1, wherein said actuator comprises hand crank and cable system.

6. The device of claim 1, wherein said internal subassembly frame further comprises a securement connector that is configured to secure the subassembly to the internal subassembly frame.

7. The device of claim 1, wherein the subassembly comprises a tool support subassembly that is removably connected to said internal subassembly frame and configured to support an otherwise manual tool.

8. The device of claim 7, wherein said tool support subassembly further comprises:
    an auger tool support frame having a pair of upstanding arm portions connected to a horizontal member forming U-shaped support configured to cradle otherwise handheld auger device;
    said auger tool support frame further comprising brackets adapted to support an auger handles and blade support in a static position.

9. The device of claim 7, wherein said tool support subassembly further comprises:
    a lawn care tool support frame having an upper portion connected configured to cradle otherwise handheld lawn care device;
    said lawn care tool support frame further comprising attachment members configured to support the lawn care tool in a static position.

10. The device of claim 1, wherein the subassembly comprises a lifter subassembly that is removably connected to said internal subassembly frame and is configured to support articles thereon.

11. The device of claim 10, wherein said lifter subassembly further comprises:
    a platform subassembly having an elongated platform configured to support articles thereon.

12. The device of claim 11, wherein said platform subassembly further comprises:
    a platform frame and a rotatable platform rotatably connected thereto;
    a tether and winch assembly connecting to said rotatable platform that is configured to operably control said rotatable platform position with respect to said platform frame for unloading purposes.

13. The device of claim 10, wherein said lifter subassembly further comprises:
    a lifting basket subassembly having a platform, upstanding railings.

14. The device of claim 10, wherein said lifter subassembly further comprises:
    a surface cleaning subassembly having a cleaning roller positioned on a spindle and powered by an electric motor;
    a liquid conduit having a plurality of nozzles directing fluid onto said cleaning roller.

15. The device of claim 10, wherein said lifter subassembly further comprises:
    a ground cleaning subassembly having a cleaning roller on a spindle;
    said roller being powered by an electric motor.

16. The device of claim 10, wherein said lifter subassembly further comprises:
    an overhead support subassembly having at least one elongated segment, at least one junction for joining adjacent segments, and an overhead support member.

17. The device of claim 16, wherein said overhead support member is rotatably supported.

18. The device of claim 10, wherein said lifter subassembly further comprises:
    a material lifter subassembly having at least one elongated segment, at least one junction for joining adjacent segments, and a horizontal, U-shaped support member.

19. The device of claim 1, wherein the subassembly comprises a plow subassembly that is removably connected to said internal subassembly frame and comprises a plow blade.

20. The device of claim 1, further comprises an intermediate junction between said vehicle connector and said vehicle to position said support frame with respect to said vehicle.

21. The device of claim 1, wherein the internal subassembly frame comprises a pair of vertical sections disposed internal the rectangular support frame and in vertical alignment with the first upright rail and the second upright rail, wherein the pair of vertical sections are connected via a cross member.

22. The device of claim 1, wherein the attachment sleeve comprises a plurality of attachment points, the plurality of attachment points configured to couple the subassembly to the attachment sleeve, wherein each of the plurality of the attachment point is at a distance from a vertical plane formed between the first upright rail and the second upright rail.

* * * * *